May 30, 1967     T. HANSSEN ETAL     3,322,343
OVEN PROGRAMMER
Original Filed July 25, 1962
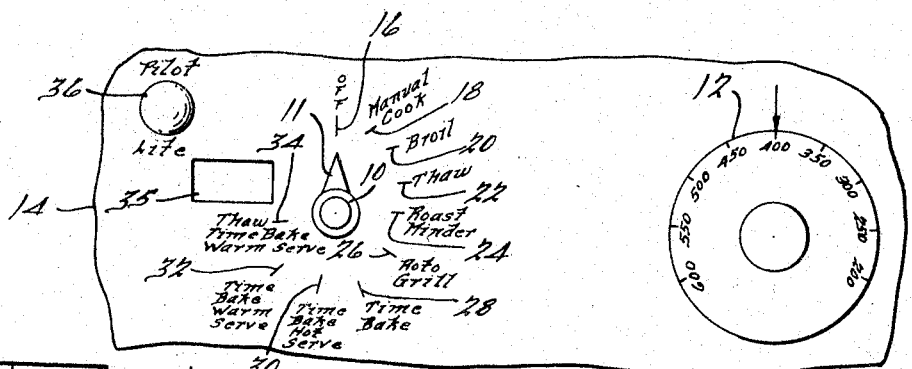
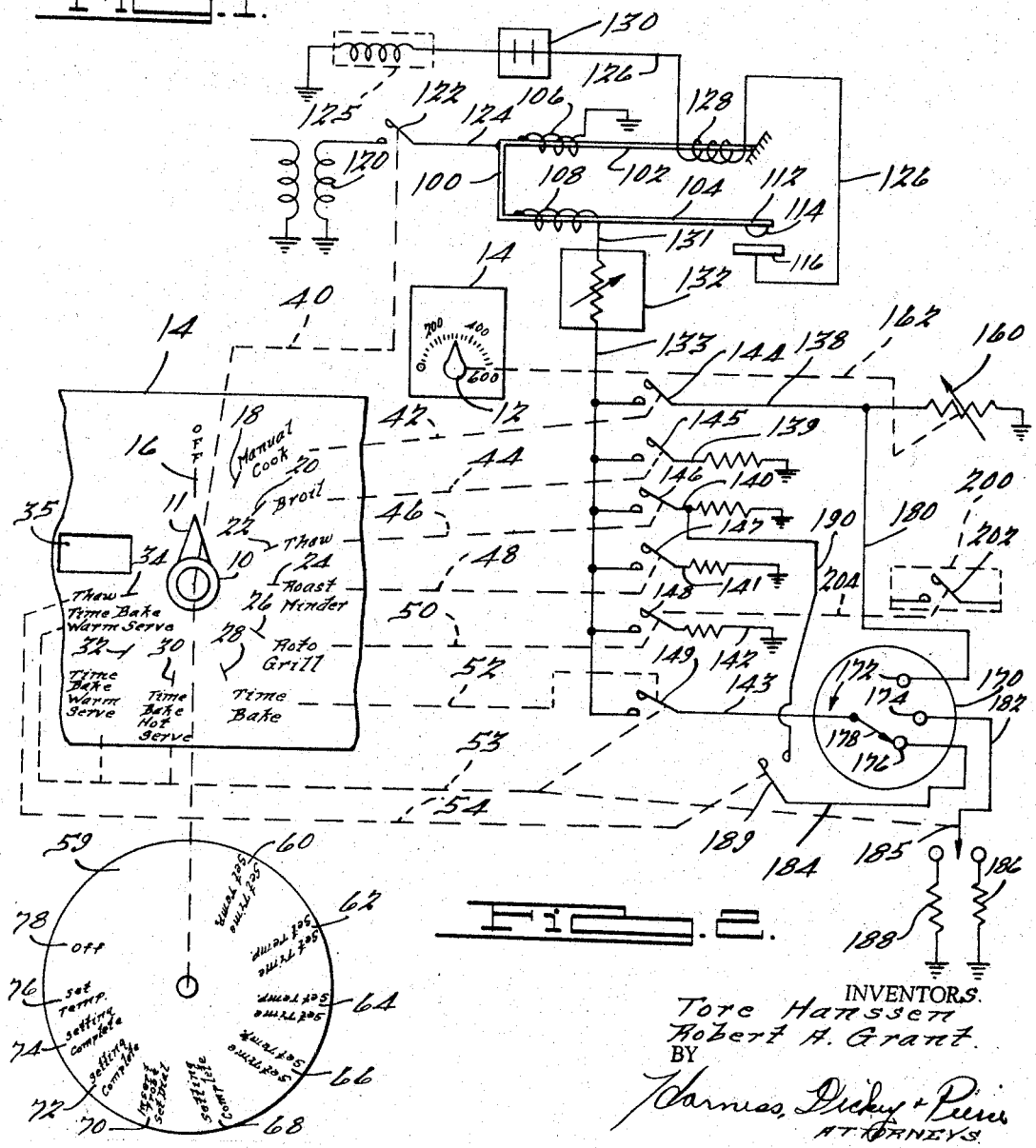
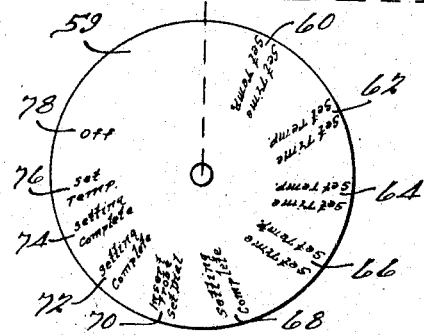
INVENTORS.
Tore Hanssen
Robert A. Grant.
BY
Barnes, Dickey & Pierce
ATTORNEYS United States Patent Office 3,322,343
Patented May 30, 1967

3,322,343
OVEN PROGRAMMER
Tore Hanssen and Robert Alexander Grant, both of Ann Arbor, Mich., assignors to King-Seeley Thermos Co., Ann Arbor, Mich., a corporation of Michigan
Continuation of application Ser. No. 212,245, July 25, 1962. This application Jan. 25, 1966, Ser. No. 532,494
1 Claim. (Cl. 236—15)

This application is a continuation of Ser. No. 212,245, filed July 25, 1962, and now abandoned.

This invention relates to an electrical control system, and more particularly to a control system for cooking apparatus such as an oven or the like.

One of the objects of the present invention is to provide an oven control system having improved means for selecting various temperature levels to be automatically maintained in the oven. To this end, a heat controlling means is operable by means of a switching unit comprising a bimetal switch actuator and a temperature sensing means responsive to oven temperatures for controlling the bimetal switch actuator in accordance with oven temperature. A plurality of control circuits, including means providing variable resistance values for varying the effect of the temperature sensing means on the bimetal switch actuator, are selectively connectible to the temperature sensing means to achieve different temperature levels in the oven for different cooking operations.

Another object of the present invention is to simplify oven temperature and function selection in a multiple function oven control system. To this end, a common control dial means is provided to obtain, for a variety of cooking operations, automatic temperature control and actuation of special accessories associated with an oven such as a rotisserie, timing means, etc.

A further object of the present invention is to provide an oven control system having a clock control and clock controlled circuitry which is separated from the main control circuitry at all times except when connected by selection of a particular control setting for a cooking operation requiring or incorporating a timing function. To this end, in the preferred arrangement, an electrical temperature selection means rather than a mechanical temperature selection means is utilized in conjunction with heat sensor means.

An additional object of the present invention is to provide an oven control system in which the manually operable portion of the selecting means of the control system comprises only a temperature setting knob and a cooking program selector knob.

Still a further object of the present invention is to incorporate in an oven control system, programming apparatus with which printed instructions relating to a particular program selection are automatically displayed for the attention of the person selecting the program by the selection manipulation. Consequently, the person selecting the program is always notified of any additional manual selection or operation required, if any, or of the fact that no additional selection or operation is required when the particular program selection is completed automatically. To this end an instruction window and movable means having instructions printed thereon are associated with the program selector means in a manner causing appropriate instructions to appear in the instruction window for each program available for selection.

The inventive principles of this invention are hereinafter disclosed in detail in conjunction with an illustrative oven programmer embodiment by reference to the accompanying drawing in which:

FIGURE 1 is a partial plan view of a control panel of an oven or the like; and

FIGURE 2 is a schematic illustration of selector means and control circuitry for effectuating an oven programming system in accordance with the principles of the invention.

Referring now to FIG. 1, the subject oven programming control system comprises a movable program selecting means such as a rotatable knob 10 having a pointer 11 and a movable temperature setting means in the form of a rotatable knob 12 which are mounted on a suitable portion of an oven panel 14. A plurality of varying program selections are indicated by selector positions 16, 18, 20, 22, 24, 26, 28, 30, 32, 34 and associated legends circumferentially spaced around the selector knob 10. An indicator and suitable indicia are associated with the temperature setting knob 12 in a conventional manner. Although particular advantageous results are obtained by the selector means 10 and setting means 12, other controls including linearly movable knobs, push buttons, etc. may also be utilized. An instruction window 35 is associated with the selector knob 10 to provide means for viewing printed instructions corresponding to particular program selections in a manner to be hereinafter described in detail. A pilot light 36 may be associated with the control mechanism of gas ovens in a conventional manner. It should be understood that the subject control system is equally well adapted for gas or electric ovens.

Accordingly, the manual operable portion of the oven control system comprises only the program selector knob 10 and the temperature setting knob 12. It may be readily appreciated by contrasting the control system shown with existing control apparatus that a substantial simplification of apparatus has been attained. Furthermore, printed instructions for each of the particular cooking programs available by manipulation of the program control knob and the temperature control knob are completely set forth for visual inspection so that the possibility of errors on the part of the person selecting the program effecting the attainment of a particular result is minimized.

As shown in FIG. 2, the program selector knob 10 is operably connected as indicated by the broken lines 40, 42, 44, 46, 48, 50, 52, 53, 54, to control switches of the control circuitry in a conventional manner. In addition, the selector knob 10 is operably connected to a movable instruction means in the form of a rotary disc 59 rotatably mounted beneath the panel 14 and having a plurality of instructions 60, 62, 64, 66, 68, 70, 72, 74, 76, 78 printed on the outer face thereof. The instructions are located in spaced correlation with the spacing of the program selector positions 16–34 so that a particular instruction will be located behind the viewing window 35 corresponding to a particular selector position. Thus, for each selected program position attained by moving the selector knob 10, a corresponding set of printed instructions appear in the window 35. The printed instructions relate to additional steps necessary to complete a particular program cycle. For example, such additionally required steps as selecting a particular temperature with knob 12, setting a time clock, inserting a meat probe, etc., are specifically spelled out in the printed instructions in a manner corresponding to particular settings attained by rotation of the selector knob 10. In some cases, the mere rotation of the selector knob will complete a particular programming cycle and therefore no additional manual manipulations will be required. When the complete program setting is attained by rotation of the selector knob, the indicia or instructions appearing in the window will indicate that fact. The instructions may be alternatively mounted on a continuous belt and associated with the selector means through gearing levers or electrically.

In general, the subject oven control system depends upon the utilization of a plurality of circuits providing varying resistance values for association with a temperature sensing unit hereinafter referred to as a sensor. The sensor is associated with a thermally activated bimetallic switching device 100 to form an automatic switching unit for causing heat to be applied to the oven as necessary to maintain a selected temperature. The switching device comprises leg portions 102, 104 which are schematically illustrated. At equilibrium each leg 102, 104 operates at a constant temperature which is equivalent to a constant electrical power maintained via resistance wires 106, 108 wound on each of the legs. One wire 106 comprises a balancing winding for compensating for line voltage variations and the other wire 108 comprises a control winding. One of the legs 102 is hereinafter referred to as a compensating leg because it provides for ambient temperature and line voltage variations compensation. The other leg 104 is hereinafter referred to as the switching leg. At its free end 112 an electrical contact 114 is mounted for engagement with a fixed contact 116.

The particular control disclosed, for illustrative purposes, is designed to be voltage compensated in a range of line voltage between 95 and 135 volts and to be temperature compensated to 200° F. The circuitry is powered through the control 100 from a transformer 120 through an on-off switch 122 and a line 124. When the contacts 114, 116 are closed, a heat control circuit is energized and a heat control device 125 is actuated through a line 126 having a feed-back winding 128 on the compensating leg 102. The heat control device may take the form of a gas valve solenoid in a gas oven or a heating element or a heating element control or relay in an electrical oven. A meat probe jack 130 may be connected in the line 126 for a purpose to be hereinafter described.

The control winding 108 is connected by a line 131 in series with an oven temperature sensor 132 which is in turn connectible in series by a line 133 with any one of a plurality of separate resistor circuits 138, 139, 140, 141, 142, 143 through switches 144, 145, 146, 147, 148, 149 actuable by the selector knob 10. The sensor 132 may take the form of a resistor having a high temperature coefficient of resistance, herein assumed to be positive. In the manual operating position 18, the selector knob 10 actuates the switch 144 to connect an oven temperature controlling rheostat 160 in series with sensor 132 and the switching leg resistance winding 108 via lines 131, 133, 138. The rheostat is operably connected to the temperature setting knob 12 in a conventional manner as indicated by the broken line 162 and is directly correlated with the oven temperature setting indicia to produce corresponding oven temperatures. In subsequent operating positions 20–34, the function of the selector knob 10 is to switch the variable resistance rheostat out of the switching leg circuit and replace it with one or more control circuits having fixed resistance values adapted to provide fixed oven temperatures.

Although the operation of the switching unit 100 is hereinafter described in detail by reference to association of the sensor 132 and rheostat 160, it should be understood that similar operations result from association of the sensor 132 and the alternative control circuits. The switching leg 104 is heated by current flowing through the winding 108 in accordance with the resistance provided by the sensor 132 and the rheostat 160. The temperatures of the legs 102, 104 control the location of contact 114 relative to contact 116. In general, the temperature attained in leg 104 is a function of the electrical summation of the sensor resistance and the resistance provided by the control circuit associated therewith.

With the assumed positive temperature coefficient of resistance sensor 132, the resistance of rheostat 160 is decreased to produce an increase in oven temperature. At any selected temperature above room temperature, the resistance of sensor 132 will be relatively low when the system is first energized and the winding 108 will generate sufficient heat to raise the temperature of leg 104 to bring contact 114 into engagement with contact 116. A circuit is thereby completed from secondary winding 120 through switch 122, line 124, the bimetal contacts 114, 116, line 126 and winding 128 to the heat control 125. The energization of winding 128 causes heating of bimetallic leg 102 resulting in deflection thereof in a direction tending to separate contacts 114, 116. In the preferred embodiment, the bimetallic elements are selected so that, when the sensed temperature is substantially below the set temperature, the tendency of leg 104 to close the contact is sufficiently greater than the tendency of leg 102 to open the contacts to prevent separation of the contacts and to maximize the initial rate of heating of the oven.

As the sensed temperature increases, the resistance of sensor 132 increases to decrease the current in winding 108 so as to reduce the force with which contact 114 is held in engagement with contact 116 by leg 104 to the point whereat the influence of the force of leg 102 will become dominant. At a temperature approaching the selected or set temperature, the force of leg 104 will be diminished relative to the force of leg 102 to the point at which contacts 114, 116 will be separated. Consequently, the heating circuit including the heat control 125 and winding 128 will be deenergized to stop further oven heating. The deenergization of winding 128 permits leg 102 to cool which will change the balance of forces in legs 102, 104 and permit contact 114 to again engage contact 116 to reenergize the heat control circuit and the winding 128. Therefore, in the preferred arrangement, the control unit tends to pulse with the on-off ratio of pulsation being controlled by the combined resistance of the rheostat and the sensor. The system may be operated on a thermostatic basis, if desired, by reducing the effectiveness of winding 128 so that the state (open or closed) of contacts 114, 116 will not change unless there is a change in the resistance of sensor 132. Other variations in the switching unit comprising the bimetal and the sensor may be equally well accommodated within the scope of the present invention.

Timing clock means, indicated generally at 170, comprising control contacts 172, 174, 176 and automatic clock circuitry are provided for timed cooking. A switch 170 is movable between the contacts 172, 174, 176 in a conventional manner in timed relationship with the clock means to alternately connect the line 143 to lines 180, 182 or 184. The line 180 is connected to rheostat 160 through line 138. Line 182 includes a switch 185 for connection to a resistance winding 186 for maintaining the oven at a "hot" temperature or to a resistance winding 188 for maintaining the oven at a "warm" temperature. The line 184 is connectible through a switch 189 to the resistance circuit 140 through line 190 to obtain a "thaw" oven temperature.

Referring now to the particular program cycles provided, it may be seen that when the selector knob 10 is in the off position at 16 an instruction 78 appears in the window 35. In this condition all electric power to the control system and components is off. The rheostat position does not effect operation of the control in any way when the selector is in the off position. There is only one off position and that is operated by the selector knob 10. The instruction window correspondingly reads "Off" for added assurance that the power is completely curtailed. The indicating pilot light 36 will also be out in the off position but will be on in all other selector positions.

At position 18 which is indicated to be a "Manual Cook" position, the instruction 76 appears in the window 35. Position 18 represents a conventional manual bake position. The instruction in the window reads "Set Temperature" and indicates to the operator that the proper oven temperature is to be selected by turning the rheostat knob 12 to the desired temperature. The desired temperature is thereby attained by selecting a particular resistance on the rheostat.

Any movement of the control knob beyond the "Off" position at 16 closes switch 122 and the low voltage transformer 120 is therefore connected to the control 100 in all "On" positions.

At position 20, which is indicated to be a "Broil" position, an instruction 74 appears in the window 35. A fixed resistance 139 is switched into the switching leg circuitry in place of the rheostat 160 by switch 145. The resistance provides a high broiling temperature of, for example, 675° F. The instruction in the window reads "Setting Complete." Consequently, the oven operator is advised that no additional manual operations are required.

Program setting 22 represents a "Thaw" position and instruction 72 appears in the instruction window 35. In this position a fixed resistance 140 is switched into the circuitry in place of the rheostat 160 by switch 146. This provides a low temperature of, for example, 140° F. The instruction in the window reads "Setting Complete" to again advise the oven operator that no further control manipulation is required.

The selector position 24 represents a "Roast Minder" position whereat automatic roast cooking by use of a special type of meat probe inserted into the roast may be attained. The probe may be of the general type described in copending application of Tore B. Hanssen, Ser. No. 143,748 and is provided with a set of internal contacts which open and close in response to the combination effect of internal meat temperature and oven temperature. The instruction window contains an instruction 70 such as, "Insert Probe—Set Dial." The probe has a dial which may be set to attain a particular cooking result and is calibrated to provide selections such as rare, medium or well. The probe has a jack connection for association with the jack plug 130 in line 126. When the probe is connected, the probe contacts control energization of the heat control 125. The sensor 132 and resistance circuit 141 merely set an upper oven temperature limit and the probe contacts operate below that temperature to vary the oven temperature to obtain the selected cooking results.

Position 26 represents a "Roto Grill" operation wherein a rotisserie having a drive motor circuit 200 is utilized. The selector knob 10 connects a fixed resistance 142 in series with the sensor 132 by actuation of switch 148 to provide an oven temperature of, for example, 325° F. The selector knob also actuates a rotisserie motor switch 202 as indicated by the broken line 204. The instruction 68 in the window reads "Setting Complete."

The selection position 28 represents a "Time Bake" operation. The instruction 66 in the window reads "Set Time—Set Temperature." The cooking temperature is selected with the setting knob 12 and the start and stop times are set on a conventional automatic clock. Movement of the selector knob 10 actuates switch 149 to connect the clock 170 in series with the sensor 132. The clock switch 178 engages clock contact 172 when the start time arrives and the sensor circuitry is energized through line 180 and the rheostat 160. The switching leg of the bimetal control 100 energizes the heat control 125 to maintain the oven temperature at the selected value determined by the resistance setting of the rheostat. When the stop time arrives switch 178 engages contact 174 and the rheostat circuitry is opened which causes the switching contacts 114, 116 to open.

The position 30 represents a "Time Bake—Hot Serve" operation wherein the previously described "Time Bake" operation is repeated except for the additional actuation of switch 185. The instruction 64 in the window is the same "Set Clock—Set Temperature." The actuation of switch 185 connects clock contact 174 to the fixed resistance 186 through line 182. The operation of the programming control circuitry is the same until switch 178 moves into engagement with contact 174 after the elapse of the stop time. The fixed resistance 186 is then inserted into the circuitry in place of the rheostat 160 to maintain the oven at a low warming temperature of, for example, 140° F. until the selector knob 10 is turned to off position.

At position 32, a "Time Bake—Warm—Serve" operation is obtained. The instruction 62 in the window is the same "Set Time—Set Temperature" and the operation is the same except that switch 185 is actuated into engagement with a resistor 188 which will maintain the oven at a lower temperature than the resistance 186 when the switch 178 engages contact 174.

The final position 34 is a "Thaw—Time Bake—Warm Serve" operation wherein the oven is to be maintained at three different temperatures. The associated instruction 60 is the same "Set Time—Set Temperature." Movement of selector knob 10 to the position 34 actuates switch 189 in addition to switches 149 and 185. Initial engagement of switch 178 with contact 176 connects resistor 140 in series with the sensor 132 through line 190, switch 189, line 184, switch 178, line 143, switch 149 and line 133. The oven temperature is thereby maintained at a suitable level for thawing until a time interval passes whereupon switch 178 engages contact 172 and subsequently contact 174 as hereinbefore described with reference to position 32.

It should be noted that the aforedescribed oven control system features, among others, maximum elimination of separate manual temperature selection steps; the provision of automatically operated accessories such as the rotisserie; and the provision of automatic multiple temperature operation through a clock circuit which is connected into the main operating circuitry only when being utilized.

Prior art systems which are capable of providing wide ranges of cooking operations have required the use of a separate thermostat or sensor 132 for each different temperature at which the oven may be operated in any given sequence. By utilizing a temperature selection means of the present invention, the particular advantages of a single sensor system are attainable.

In prior art clock control systems, it is common to have the main control circuitry connected through the clock at all times. Consequently, the oven operator must remember to reset the clock to an off position when utilizing non-timed operations. In the present system, the clock is connected only at specific times for particular cooking operations.

It will be obvious that any of a variety of program selection may be provided around the periphery of the selector dial by incorporating various temperature resistances and actuating various switches in the control circuitry in varying patterns. Accordingly, the particular selection of programming illustrated is not critical and the sequence arrangement thereof may be varied as desired. Since the inventive principles hereinbefore described in detail may be applied in varying manners to varying apparatuses, it is intended that the scope of the appended claim include the inventive principles wherever utilized.

What is claimed is:

An oven controlling system for obtaining a plurality of cooking results comprising: a heat control means, an energy source, a bimetal control means having a compensating leg and a control leg, said heat control means being connected to said energy source through said bimetal control, a temperature sensor means connected in series to said energy source through said bimetal control to control actuation of said heat control means, a plurality of resistance circuit means, switch means to selectively alternately connect said plurality of resistance circuit means to said sensor means and said bimetal control to vary the temperature at which said heat control means is actuable to supply heat to said oven, one of said resistance circuit means comprising a manually operable rheostat for selecting oven temperatures for baking operations and the rest of said resistance circuit means providing single fixed resistances for obtaining set oven temperatures for particular cooking results, an operation selector knob, a timer means provided to control connection of some of said resistance circuit means to said sensor means and said bimetal control, said timer means being operably connected in said system only at selectable positions by movement of said operation selector knob to the certain positions representing timed cooking operations, thus forming a program selector, said program selector comprising a rotatable control knob, a plurality of switching positions provided around the rotative path of said control knob, switch mechanism operable by said control knob at each of said selector positions to switch in varying control circuitry for particular functions, an instruction plate associated with said control knob and being operable thereby, an instruction viewing area provided adjacent said control knob, and instruction indicia provided on said instruction plate and located relative to said control settings and said viewing area so that particular instructions are placed in said viewing area for certain control settings.

References Cited

UNITED STATES PATENTS

| | | | |
|---|---|---|---|
| 2,219,147 | 10/1940 | Binder et al. | 236—46 X |
| 2,786,924 | 3/1957 | Kronmiller. | |
| 2,819,371 | 1/1958 | Aldrich et al. | 236—15 X |
| 2,910,569 | 10/1959 | Boddy | 236—68 X |
| 3,005,080 | 10/1961 | Bletz. | |
| 3,069,524 | 12/1962 | Hanssen. | |
| 3,191,861 | 6/1965 | Dahlgren | 236—46 X |

ROBERT A. O'LEARY, *Primary Examiner.*

ALDEN D. STEWART, *Examiner.*

W. E. WAYNER, *Assistant Examiner.*